Aug. 13, 1957  A. GILMOUR  2,802,444
NURSERY TOILET DEVICE
Filed Jan. 3, 1956

INVENTOR.
AUSTIN GILMOUR
BY
Clayton L. Jenks
ATTORNEY

United States Patent Office 2,802,444
Patented Aug. 13, 1957

2,802,444

A NURSERY TOILET DEVICE

Austin Gilmour, Springfield, Mass.

Application January 3, 1956, Serial No. 556,975

3 Claims. (Cl. 116—67)

This invention relates to a nursery toilet device, and more particularly to a device which will encourage orderly habits of elimination by an infant at an optimum early age.

An infant has no control over his bladder and bowel movements for the first many months of life when he cannot yet sit up, yet his parents desire to encourage the baby at the earliest possible age to wait for or to request the use of a toilet receptacle. The training of the child involves much patience and a long, arduous effort to impress the young mind with the importance of intelligent control. Child authorities have written much on the subject, and usually come to the conclusion that bowel training should be left almost entirely to the baby himself. That is, somewhere in the latter half of the second year, he will become aware of the necessity for a bowel movement and will be able to control it for a short time and possibly make some sound that he is ready, so that the parent can lead him to the proper place.

The parent, however, can start the training earlier, or as soon as the child's mind is receptive and the muscular control is adequate. As part of the training, the parent should provide the baby with a suitable toilet seat and acquaint the infant with its purpose. Since a child feels more secure on a low chair than on an adult toilet seat or on an unstable receptacle, commonly known to the child as a "potty," the parent should further encourage the child to seek that particular toilet chair provided for the purpose and not to be hostile to it. More important, there should be an incentive or even a reward to encourage him to seek or express a desire for the toilet seat in ample time.

The primary object of my invention is to satisfy such requirements and provide a nursery toilet device which, upon the completion of an act of elimination, will automatically present a pleasing sound, such as a musical tune, and thus both entertain the child as well as give an audible signal to the parent. Other objects will be apparent in the following disclosure.

In accordance with my invention, I have provided a nursery toilet device comprising a seat and a receptacle removably stored therebeneath which is so mounted and arranged that the weight of matter eliminated from either the bowel or the bladder will cause movement of the receptacle, which in turn causes the actuation of a musical device, such as a standard music box. A child is surprised or pleased by the music and accepts the tune as a reward and an encouragement for a similar performance at another opportune time. This stimulates the child to look forward to the tinkling sounds of the vibrating reeds of a common music box and which will not be heard until the desired elimination has been accomplished.

Referring to the drawings illustrating a preferred embodiment of the invention:

Figure 1:
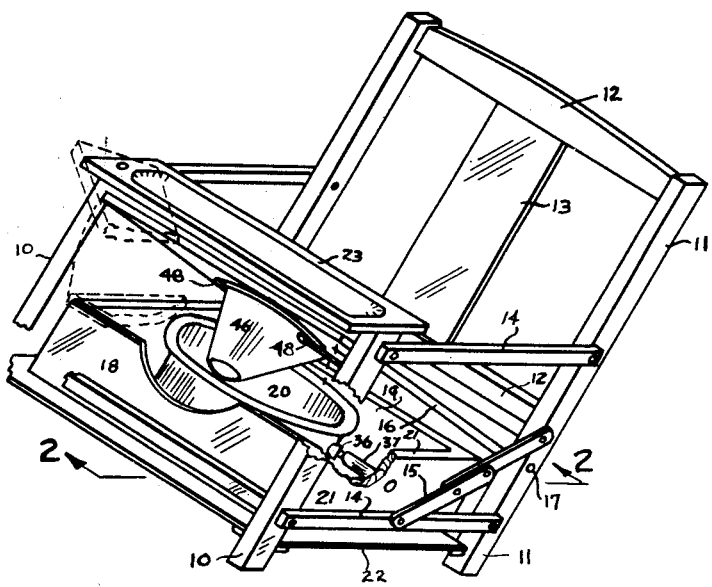
Fig. 1 is a perspective view, partly broken away, with the toilet seat in a raised position.

The construction illustrated in the drawings comprises a standard or typical form of a child's nursery toilet chair. This comprises a framework having front legs 10 suitably connected to rear legs 11, the latter extending upwardly to form a back which has cross pieces 12 and 13. The chair is made foldable by having its parallel side arms 14 pivotally connecting the front and rear legs. They are held in an operative position by a folding brace or a so-called fall support 15 of standard make. The toilet seat 16 (Fig. 1) is a wooden or plastic frame hinged on pivot pins 17 suitably mounted on the rear legs 11 or framework and so arranged that the seat may be tilted to an upward position to permit ready removal of the chamber or receptacle 20. The seat is normally located at a convenient level for a child to sit securely on it. The receptacle 20 is mounted within a framework formed of the vertical front wall 18 and back wall 19 cooperating with side wall pieces 21 which provide a closure to prevent access to the receptacle except when the seat 16 is tilted upwardly. A bottom 22 carries the framework walls and is suitably supported on pegs projecting from the chair legs. A swinging tray 23 is pivotally mounted on the top of one of the front legs 10, the parts being so arranged that the tray may be swung into and out of position where it will hold the child seated. Various other constructional features may be incorporated in the chair.

In accordance with my invention, I have mounted the receptacle 20 in such a manner that when material is deposited therein, the receptacle will move sufficiently to cause the operation of a musical instrument, such as a standard form of power operated music box. The receptacle is preferably so mounted that movement of the chair by the child will not release the music box control. Of the various mounts that are suitable, I prefer one which carries the weight of the receptacle so balanced that it will be moved only by being over balanced by material normally added thereto.

Figure 4:
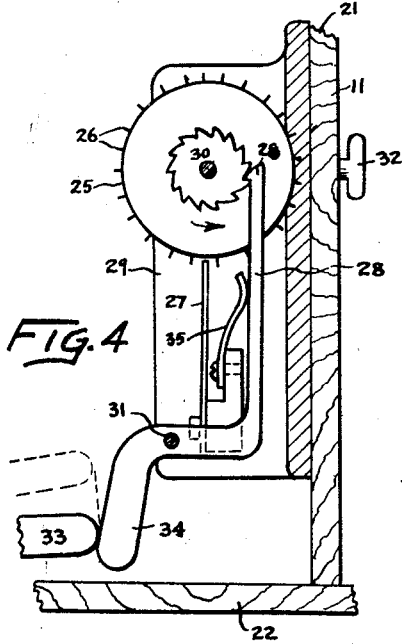
Fig. 4 is an enlarged fragmentary detail of the pawl and ratchet control mechanism for the music box.

The music box may be of standard construction and as illustrated in Fig. 4 comprises a metal cylinder or drum 25 having steel pegs 26 so mounted thereon that as the cylinder is rotated by means of power, such as a spiral spring (not shown), the pegs will strike serially various ones of a set of spring metal reeds 27 and cause them to vibrate, as is well understood. The drum 25 tends to be rotated in the direction of the arrow (Fig. 4), but rotation is normally prevented by means of a rocking lever 28 having a pawl on its upper end. The pawl is normally engaged against one of the teeth of a ratchet wheel 30 fixed to rotate with the drum 25. The pawl 28 is mounted as a lever of the first class on a pin 31 fixed on a vertical flange 29 projecting forwardly from the rear wall support of the music box drum. A wind-up button 32 projecting through the rear wall is suitably connected with the music box, so that the spring may be brought under tension for operating the drum when the control pawl 28 is released by movement of the receptacle.

In the embodiment illustrated, the receptacle 20 is so mounted on a rocking platform 33 that deposition of matter in the receptacle will tilt the platform upwardly and release the pawl 28 and permit the music box to sound. The platform 33 is medially supported as a lever of the first class beneath the receptacle and so arranged that forward tilting of the receptacle moves this lever to raise its rear end and release the control pawl. The pawl lever 28 has an S-shape, as shown in Fig. 4, and its lower arm 34 is normally engaged by the pivoted platform 33 in such a manner that the pawl is held in engagement with the ratchet wheel 30. When the platform 33 is tilted upwardly at its rear end to the position shown in dotted outline in Fig. 4, it releases the rocking pawl. A spring 35 is so mounted and arranged that it normally urges the pawl away from the ratchet teeth, but the spring is held inoperative when the platform 33 is locked against the lower front portion of the arm 34. When the platform 33 is tilted upwardly, it provides sufficient space for movement of the arm 34 so that the spring 35 may release the pawl from the ratchet wheel and permit the music box rotor to rotate, if the spring has been previously wound, and thus provide a musical tune.

Of the various constructions which may be employed to insure that an additional weight added to the receptacle 20 will cause the release of the music box control arm 34, I prefer the construction illustrated in the drawings. As there shown, the receptacle 20 is pivotally mounted in such a position that material deposited in it will cause it to tilt downwardly at its forward end and lift the rear portion of the platform 33 to release the music box. That is, the receptacle 20 may have pivots 36 (Fig. 1) suitably projecting in diametrical or axial alignment, and these pivots may project into hollow sleeve-like bearings 37 secured to and projecting inwardly from the side walls 21. Thus the weight of the receptacle is borne solely by these pivots 36, 37. If desired, each pivot 36 may be an inwardly projecting part of the supporting member 37; and in that case, the receptacle 20, usually made of a flexible plastic material, such as a polyethylene composition, may have two small holes or sockets diametrically and oppositely arranged and into which the bearing members 36 may be sprung. To remove the receptacle from either type of bearing construction, the chamber wall 20 may be bent inwardly enough to release the pivot from its socket.

In order to insure a slight forward tilting of the receptacle 20, one or more buttons 40 may be suitably mounted on the platform 33 and project upwardly to such a position that the bottom of the receptacle is normally tilted relative to the bearing mount 36. There may be a slight clearance between the bottom of the receptacle 20 and the platform 33 at the front end so that the receptacle is normally carried on the button 40 and its pivots 37 and any slight jarring of the device will not move the platform materially. A stop 42 may be suitably secured in the bottom wall 22 of the framework and project upwardly through an elongated slot in the platform. It has an enlarged head which limits the upward swing of the rear end of the platform 33. The receptacle 20 may have a handle portion 44 projecting at its rear end for ease in carrying the same, and that handle is hollow as indicated and may have a weight 45 fixed therein to provide a fairly delicate balance of the receptacle about its pivots.

Figure 2:
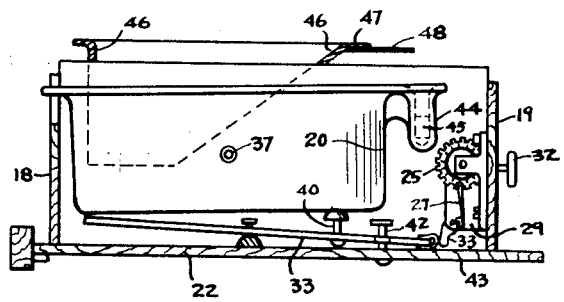
Fig. 2 is a section on the line 2—2 of Fig. 1 with the receptacle in its initial non-tilted position.
Figure 3:
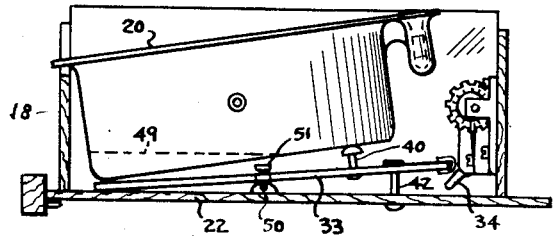
Fig. 3 is a similar view, with parts removed, which shows the receptacle in its final tilted position.

To insure that material will be deposited only on the front bottom portion of the pivoted receptacle, I secure beneath the seat 16 a hollow open-ended cone 46 of a suitable plastic material which opens at its lower smaller end in front of the axis of the receptacle pivots. This is insured by the cone being non-symmetrical, as shown in Fig. 2. The cone may have an annular outwardly projecting flange 47 at its upper end which is adapted to ride on the top of inwardly projecting parallel slideways 48 suitably mounted on the under side of the seat 16 and so arranged that the cone may be very readily removed for cleansing purposes. The top opening of the cone is slightly larger than and concentric with the opening through the toilet seat. Hence, if material, indicated by the dotted line 49 in Fig. 3, is deposited in the receptacle, it will insure that the latter tips forward and thus releases the control arm 34 of the music box. The platform 33 may be rockingly supported on a half round wooden strip 50 having a groove in its upper portion in which the lower end of a set screw 51 rides and thus serves to locate the platform. Various constructional details may be adopted to insure a satisfactory pivoting action.

The advantages inherent in this construction will be readily appreciated. A child soon learns that a pleasing musical sound may be obtained only by the desired eliminative process, and his training proceeds accordingly. The parent may wind the music box at the time of cleaning the receptacle 20 and the cone conduit 46, which are readily removable for the purpose. The musical sound may be heard at a distance, so that the parent is audibly notified that the child is ready to be removed from the toilet seat. Hence, this signal system makes it feasible for the parent to go about other duties while the child sits there. Thus, the training of the child proceeds without antagonism between the child and the parent and under conditions which are pleasant and rewarding.

It will be understood that various modifications may be made in the construction to embody the general principles of this invention and that the above description of a preferred embodiment is not to be interpreted as imposing limitations on the appended claims.

I claim:

1. A nursery toilet device comprising a frame providing a toilet seat, a receptacle beneath the seat, pivotal mounts on the frame forming the sole support for the receptacle and providing for a tilting movement of the receptacle when eliminative material is added, a power operated musical device, a releasable control mechanism normally preventing operation of the device, and a movable member mounted independently of the receptacle which normally prevents movement of the control mechanism and operation of the musical device, said member and receptacle being so arranged that the control mechanism is normally held inoperative and it is released only by said tilting movement of the receptacle causing movement of said member.

2. A device according to claim 1 in which the movable member is a lever of the first class pivoted beneath the receptacle and moved by tilting of the receptacle to release the control mechanism.

3. A chair according to claim 1 comprising a conduit mounted beneath the seat which leads all eliminative material to a position on one side of the receptacle pivots, and wherein the receptacle is normally tilted towards said side.

References Cited in the file of this patent
UNITED STATES PATENTS
2,535,704  Snyder _____ Dec. 26, 1950